US012557789B2

(12) United States Patent
Biffert et al.

(10) Patent No.: US 12,557,789 B2
(45) Date of Patent: Feb. 24, 2026

(54) LIVESTOCK WATER MONITORING SYSTEM

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L. Mehring, Fargo, ND (US); Keith D. Alsleben, Fargo, ND (US); Braydon W. Love, Fergus Falls, MN (US); Chad A. Heath, Fargo, ND (US)

(73) Assignee: 701x Inc., Fargo, ND (US)

( * ) Notice: Subject to any disclaimer, the term of this patent is extended or adjusted under 35 U.S.C. 154(b) by 117 days.

(21) Appl. No.: 18/302,351

(22) Filed: Apr. 18, 2023

(65) Prior Publication Data

US 2024/0349702 A1    Oct. 24, 2024

(51) Int. Cl.
*A01K 29/00*       (2006.01)
*A01K 7/02*        (2006.01)
(52) U.S. Cl.
CPC ............ *A01K 29/005* (2013.01); *A01K 7/025* (2013.01); *A01K 7/027* (2013.01)
(58) Field of Classification Search
CPC .. G08B 29/00; G05B 23/027; G05B 23/0272; G06F 15/16; G06F 15/173; H04L 51/58; H04L 51/224; H04L 67/00; H04L 67/02; H04L 67/303; H04M 11/00; H04M 11/002; H04M 11/04; H04Q 7/00; H04Q 7/20
See application file for complete search history.

(56) References Cited

U.S. PATENT DOCUMENTS

| | | | |
|---|---|---|---|
| 4,461,241 A | 7/1984 | Ostler | |
| 4,503,808 A | 3/1985 | McAlister | |
| 4,512,096 A | 4/1985 | Heidecker | |
| 5,711,246 A | 1/1998 | Yano | |
| 5,791,294 A | 8/1998 | Manning | |
| 5,794,569 A * | 8/1998 | Titus .................... A01K 15/023 | |
| | | | 119/721 |

(Continued)

FOREIGN PATENT DOCUMENTS

| | | |
|---|---|---|
| AU | 2017239570 A1 | 4/2018 |
| CN | 101221231 A | 7/2008 |

(Continued)

OTHER PUBLICATIONS https://www.gammon.com.au/power; "Power Saving Techniques for Microprocessors" Gammon Forum Webpage; Jan. 13, 2012.

(Continued)

*Primary Examiner* — Van T Trieu
(74) *Attorney, Agent, or Firm* — Neustel Law Offices

(57) ABSTRACT

Livestock water monitoring systems and methods are disclosed herein. An example system includes a controller configured to receive sensor output from a sensor associated with an animal when the animal is in communication range of the system, monitor the sensor output to detect behavior parameters when the animal is in communication range with the base station, generate an alert message when a deviation is detected in the behavior parameters, and transmit the alert message to at least one recipient.

6 Claims, 5 Drawing Sheets

(56) References Cited

U.S. PATENT DOCUMENTS

| | | | |
|---|---|---|---|
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |
| 6,788,199 B2 | 9/2004 | Crabtree |
| 6,805,078 B2 | 10/2004 | Zimmerman |
| 6,868,804 B1 | 3/2005 | Huisma |
| 6,997,140 B2 | 2/2006 | Finlayson |
| 6,998,980 B2 | 2/2006 | Ingley, III |
| 6,998,985 B2 | 2/2006 | Reisman |
| 7,059,275 B2 | 6/2006 | Laitinen |
| 7,164,986 B2 | 1/2007 | Humphries |
| 7,218,229 B2 | 5/2007 | Boyd |
| 7,234,421 B2 | 6/2007 | Natividade |
| 7,248,167 B2 | 7/2007 | Wassingbo |
| 7,335,168 B2 | 2/2008 | Rugg |
| 7,411,492 B2 | 8/2008 | Greenberg |
| 7,467,603 B2 | 12/2008 | Davies |
| 7,525,425 B2 | 4/2009 | Diem |
| 7,616,124 B2 | 11/2009 | Paessel |
| 7,728,724 B1 | 6/2010 | Scalisi |
| 7,830,257 B2 | 11/2010 | Hassell |
| 7,904,244 B2 | 3/2011 | Sugla |
| 7,918,185 B2 | 4/2011 | Araki |
| 8,018,329 B2 | 9/2011 | Morgan |
| 8,125,332 B2 | 2/2012 | Curran |
| 8,149,125 B2 | 4/2012 | Geissler |
| 8,285,245 B2 | 10/2012 | Ashley, Jr. |
| 8,312,845 B2 | 11/2012 | Guinta |
| 8,340,022 B2 | 12/2012 | Lee |
| 8,849,926 B2 | 9/2014 | Marzencki |
| 8,890,677 B2 | 11/2014 | Raphaeli |
| 8,979,757 B2 | 3/2015 | Mottram |
| 8,983,426 B2 | 3/2015 | Cermak |
| 9,038,293 B2 | 5/2015 | Decaluwe |
| 9,044,297 B2 | 6/2015 | Rajkondawar |
| 9,370,170 B2 | 6/2016 | Downing |
| 9,448,072 B2 | 9/2016 | Bandyopadhyay |
| 9,449,202 B2 | 9/2016 | Clare |
| 9,489,813 B1 | 11/2016 | Beigel |
| 9,504,387 B2 | 11/2016 | Lanza |
| 9,848,577 B1 | 12/2017 | Brandao |
| 9,936,676 B1 | 4/2018 | Ulmer |
| 9,980,467 B2 | 5/2018 | Auer |
| 10,075,813 B1 | 9/2018 | Struhsaker |
| 10,242,547 B1 | 3/2019 | Struhsaker |
| 10,292,370 B2 | 5/2019 | Mobley |
| 10,660,546 B2 | 5/2020 | Saigh |
| 10,697,947 B1 | 6/2020 | Armitage |
| 11,232,393 B1 | 1/2022 | Kim |
| 11,503,802 B2 | 11/2022 | Jones |
| 12,029,197 B1 | 7/2024 | Biffert |
| 2002/0046713 A1 | 4/2002 | Otto |
| 2002/0050248 A1 | 5/2002 | Pratt |
| 2004/0074448 A1 | 4/2004 | Bunt |
| 2004/0078390 A1 | 4/2004 | Saunders |
| 2005/0006153 A1 | 1/2005 | Baarsch |
| 2005/0162279 A1 | 7/2005 | Marshall |
| 2006/0097882 A1 | 5/2006 | Brinkerhoff |
| 2006/0161443 A1 | 7/2006 | Rollins |
| 2006/0201432 A1 | 9/2006 | Pratt |
| 2006/0267731 A1 | 11/2006 | Chen |
| 2007/0012260 A1 | 1/2007 | Boyd |
| 2007/0171048 A1 | 7/2007 | Shapiro |
| 2007/0209594 A1 | 9/2007 | Kaever |
| 2007/0229350 A1 | 10/2007 | Scalisi |
| 2008/0147458 A1 | 6/2008 | Yamazaki |
| 2010/0030036 A1 | 2/2010 | Mottram |
| 2010/0127853 A1 | 5/2010 | Hanson |

| | | | |
|---|---|---|---|
| 2010/0156606 A1 | 6/2010 | Gold | |
| 2011/0102154 A1 | 5/2011 | Hindhede | |
| 2011/0125062 A1 | 5/2011 | Mulder | |
| 2011/0125065 A1 | 5/2011 | Voronin | |
| 2011/0148639 A1 | 6/2011 | Geissler | |
| 2011/0192356 A1 | 8/2011 | Loosveld | |
| 2012/0050046 A1 | 3/2012 | Satorius | |
| 2012/0065483 A1 | 3/2012 | Chung | |
| 2012/0294876 A1 | 11/2012 | Zimmerman | |
| 2013/0175347 A1 | 7/2013 | Decaluwe | |
| 2013/0340305 A1 | 12/2013 | Mobley | |
| 2014/0237595 A1 | 8/2014 | Sridhara | |
| 2015/0039239 A1* | 2/2015 | Shuler | G16H 40/67 |
| | | | 702/19 |
| 2015/0097668 A1 | 4/2015 | Toth | |
| 2015/0282457 A1 | 10/2015 | Yarden | |
| 2015/0373951 A1 | 12/2015 | Kelly | |
| 2016/0143719 A1 | 5/2016 | Folkers | |
| 2017/0156288 A1 | 6/2017 | Singh | |
| 2017/0196203 A1 | 7/2017 | Huisma | |
| 2018/0048987 A1 | 2/2018 | Morris | |
| 2018/0054399 A1 | 2/2018 | Shinoda | |
| 2018/0146645 A1 | 5/2018 | Arbel | |
| 2018/0160649 A1 | 6/2018 | Hicks | |
| 2018/0279582 A1 | 10/2018 | Yajima | |
| 2018/0295809 A1 | 10/2018 | Yajima | |
| 2018/0374165 A1 | 12/2018 | Ferro dos Santos | |
| 2019/0008117 A1 | 1/2019 | Dijkstra | |
| 2019/0008124 A1 | 1/2019 | Komatsu | |
| 2019/0141959 A1 | 5/2019 | Ingham | |
| 2019/0220844 A1 | 7/2019 | Trivelpiece | |
| 2019/0223408 A1 | 7/2019 | Brayer | |
| 2019/0254601 A1 | 8/2019 | Blackmore | |
| 2019/0380311 A1 | 12/2019 | Crouthamel | |
| 2020/0022338 A1 | 1/2020 | Rovnyi | |
| 2020/0029534 A1 | 1/2020 | Austin | |
| 2020/0085005 A1* | 3/2020 | Yoo | E03B 9/20 |
| 2020/0107522 A1 | 4/2020 | Kersey | |
| 2020/0125849 A1 | 4/2020 | Labrecque | |
| 2020/0159720 A1 | 5/2020 | Leong | |
| 2020/0160009 A1 | 5/2020 | Vatn | |
| 2020/0323170 A1 | 10/2020 | Garigan | |
| 2020/0359605 A1* | 11/2020 | Maher | A01K 27/009 |
| 2020/0367471 A1 | 11/2020 | Deliou | |
| 2021/0148881 A1 | 5/2021 | Deng | |
| 2022/0104929 A1 | 4/2022 | Cummins | |
| 2022/0192150 A1 | 6/2022 | Biffert | |
| 2022/0192151 A1 | 6/2022 | Biffert | |
| 2022/0192152 A1 | 6/2022 | Biffert | |
| 2022/0200519 A1 | 6/2022 | Biffert | |

FOREIGN PATENT DOCUMENTS

| | | | |
|---|---|---|---|
| EP | 3153095 A1 | 4/2017 |
| EP | 3188648 B1 | 1/2020 |
| FR | 2801491 A1 | 6/2001 |
| GB | 2387465 A | 10/2003 |
| WO | 2000011939 A2 | 3/2000 |
| WO | 2005034617 A1 | 4/2005 |
| WO | 2019245978 A1 | 12/2019 |
| WO | 2020031050 A1 | 2/2020 |
| WO | 2020120516 A1 | 6/2020 |
| WO | 2021255731 A1 | 12/2021 |
| WO | 2022005288 A1 | 1/2022 |
| WO | 2022145792 A1 | 7/2022 |
| WO | 2023159272 A1 | 8/2023 |

OTHER PUBLICATIONS

PCT International Search Report and Written Opinion for PCT/US2023/086378; Apr. 11, 2024.

PCT International Search Report and Written Opinion for PCT/US2023/086390; Apr. 19, 2024.

Notice of Allowance Document Received for U.S. Appl. No. 18/162,885; Received May 8, 2024.

http://www.sensehubbeef.com/; Allflex Livestock Intelligence "SenseHub Beef" Webpage.

(56) References Cited

OTHER PUBLICATIONS http://www.sensehubbeef.com/documents/pdf/SenseHubBeef.pdf; Allflex Livestock Intelligence "SenseHub Beef" Cow Monitoring Brochure; Copyright 2018.
https://www.cerestag.com/; Ceres Tag Website.
https://web.archive.org/web/20200806065228/https://www.cerestag.com/benefits/; Internet Archive Wayback Machine Archive.org "Ceres Tag Benefits" Webpage; Aug. 6, 2020.
https://www.moovement.com.au/gps-ear-tags; mOOvement "GPS Ear Tag" Website.
https://ieeexplore.ieee.org/document/1280774; IEEE Xplore Webpage Article "Wearable Sensor System for Wireless State-of-Health Determination in Cattle"; L. Nagl; Sep. 17, 2003.
https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.
https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.
http://www.diva-portal.org/smash/get/diva2:21508/FULLTEXT01. pdf; Diva Article "Sensor Systems for Positioning and Identification in Ubiquitous Computing"; Suri Jayabharath Kumar; Feb. 13, 2006.

https://www.beefcentral.com/ag-tech/gps-enabled-livestock-monitoring-tags-reach-the-commercial-market/; GPS-enabled livestock monitoring tags reach the commercial market; Beef Central; Mar. 17, 2020.
https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
PCT International Search Report and Opinion for PCT/US2021/064611; Apr. 27, 2022.
https://shop.realmfive.com/products/behlen-guardian; "Guardian by Behlen Country powered by RealmFive" Product Webpage; RealmFive and Behlen Country; Mar. 10, 2023.
Atmel 8-Bit AVR Microcontroller with 2/4/8K Byes In-System Programmable Flash Datasheet; 2013. (Year: 2013).
Non-Final Office Action Document Received for U.S. Appl. No. 17/557,559; Received Dec. 22, 2023.
Non-Final Office Action Document Received for U.S. Appl. No. 18/303,730; Received Jan. 3, 2025.
Non-Final Office Action Document Received for U.S. Appl. No. 18/330,659; Received Oct. 10, 2024.
EPO Search Report and Opinion for Publication No. EP4266876; Oct. 8, 2024.
PCT Search Report and Opinion for PCT/US2024/029580; Sep. 17, 2024.

* cited by examiner

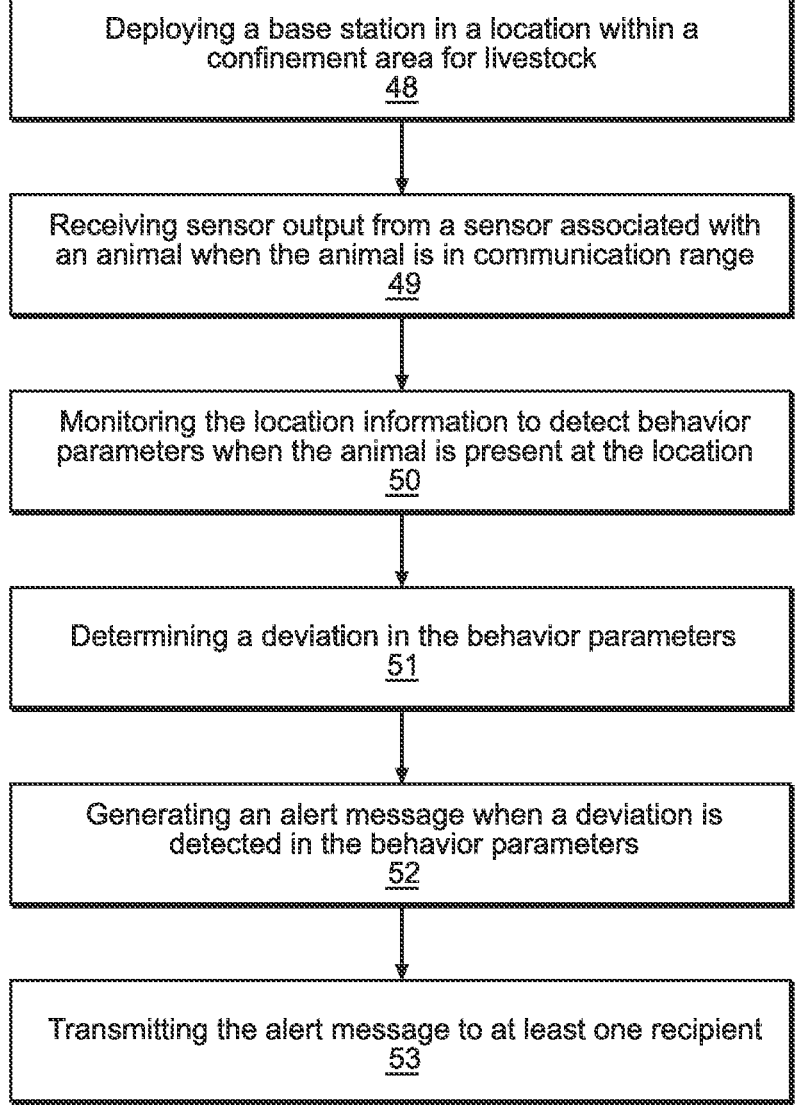

Deploying a base station in a location within a
confinement area for livestock
48

Receiving sensor output from a sensor associated with
an animal when the animal is in communication range
49

Monitoring the location information to detect behavior
parameters when the animal is present at the location
50

Determining a deviation in the behavior parameters
51

Generating an alert message when a deviation is
detected in the behavior parameters
52

Transmitting the alert message to at least one recipient
53

FIG. 4

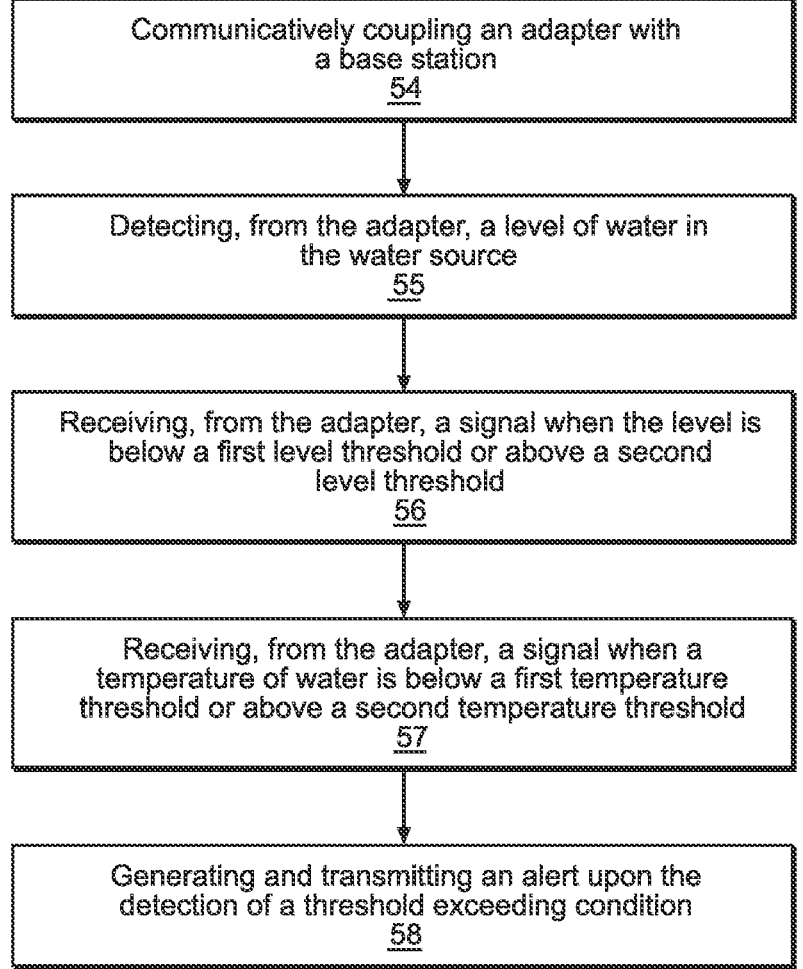

Communicatively coupling an adapter with
a base station
54

Detecting, from the adapter, a level of water in
the water source
55

Receiving, from the adapter, a signal when the level is
below a first level threshold or above a second
level threshold
56

Receiving, from the adapter, a signal when a
temperature of water is below a first temperature
threshold or above a second temperature threshold
57

Generating and transmitting an alert upon the
detection of a threshold exceeding condition
58

FIG. 5

LIVESTOCK WATER MONITORING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to systems and methods for livestock water monitoring. Some embodiments are directed to base stations and adapters associated with water sources. These base stations can be distributed around a containment area in high-traffic areas where livestock are frequently visiting. Changes in animal behavior can be detected and reported by the base stations. Additionally, water levels and water temperature can be monitored by the base stations and adapters.

SUMMARY

Some of the various embodiments of the present disclosure relate to a system placed in a location within a confinement area for livestock. The system comprises a controller and the controller in turn includes a processor and a memory for storing instructions. The processor executes the instructions to: (1) receive, by a base station, sensor output from a sensor associated with an animal when the animal is in communication range of the base station; (2) monitor the sensor output to detect behavior parameters when the animal is in communication range with the base station; (3) generate an alert message when a deviation is detected in the behavior parameters; and (4) transmit the alert message to at least one recipient.

Some of the various embodiments of the present disclosure include an adapter associated with a water source. The adapter is configured to detect a level of water in the water source. In some embodiments, the adapter is configured to transmit a signal to the system when the level is below a first level threshold or above a second level threshold. In some embodiments, the adapter is configured to transmit a signal to the system when a temperature of the water is below a first temperature threshold or above a second temperature threshold.

In some embodiments, an example method may include deploying a base station in a location within a confinement area for livestock, the base station for: (1) receiving, by a base station, sensor output from a sensor associated with an animal when the animal is in communication range of the base station; (2) monitoring the sensor output to detect behavior parameters when the animal is in communication range with the base station; (3) generating an alert message when a deviation is detected in the behavior parameters; and (4) transmitting the alert message to at least one recipient.

In some other embodiments, a system includes a sensor associated with each animal in a confinement area. The system includes a plurality of base stations, each positioned at a location in the confinement area. One of the plurality of base stations is associated with a water source. The system includes an adapter associated with the water source that is configured to output a signals indicative of a water level and a water temperature of the water source. Each of the plurality of base stations is configured to monitor the output of the sensors to detect behavior parameters and generate an alert message when a deviation is detected in the behavior parameters.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIG. 4 is a flowchart of an example method of the present disclosure.

FIG. 5 is a flowchart of another example method of the present disclosure.

DETAILED DESCRIPTION

Figure 1:
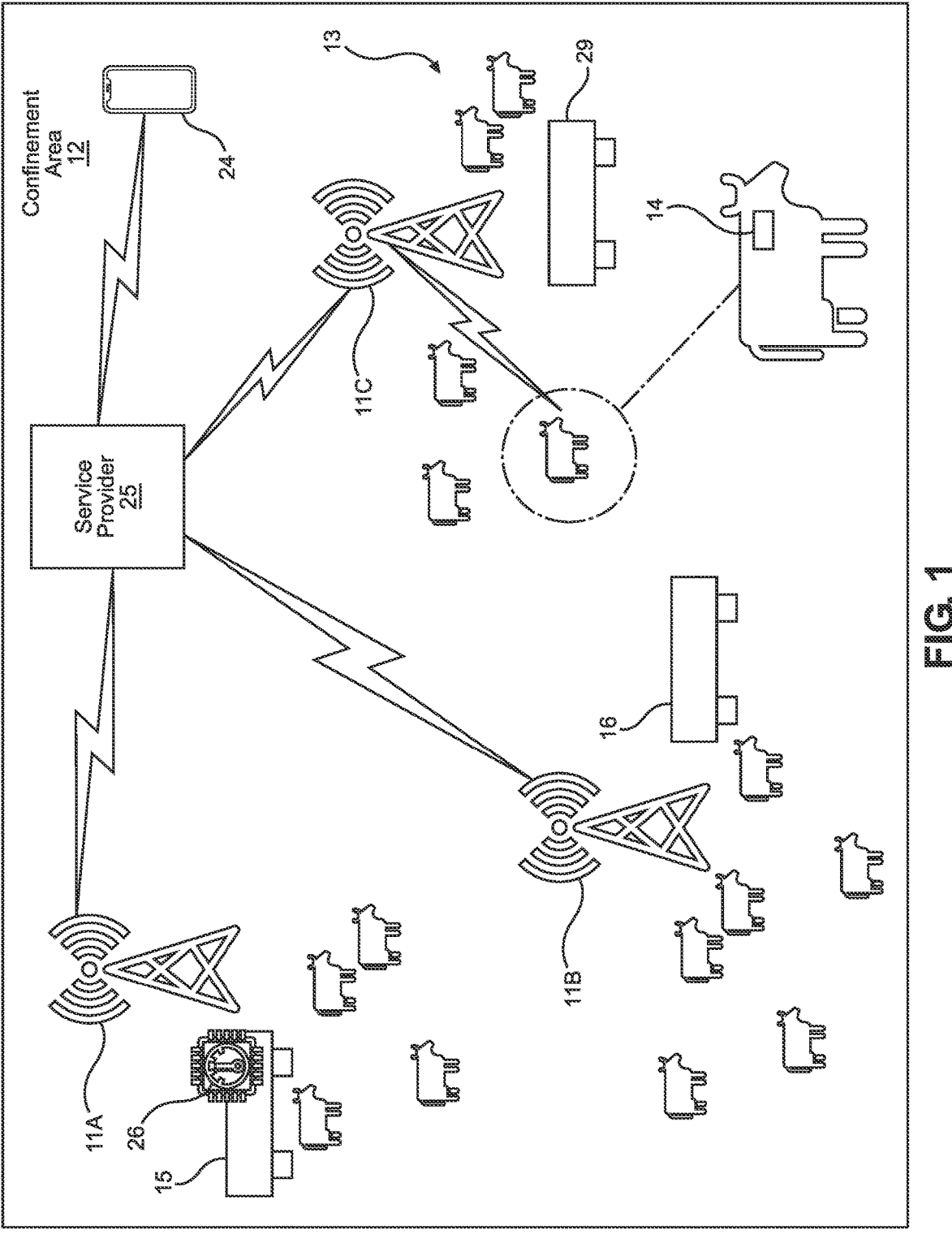
FIG. 1 is a perspective view of a system deployed in an example environment, in accordance with an example embodiment.

U.S. Patent No. US-2022-0192152-A1, the entire disclosure of which, except for any definitions, disclaimers, disavowals, and inconsistencies, is incorporated herein by reference.

A. Overview

Some of the various embodiments of the present disclosure relate to livestock water monitoring systems and methods. These systems can include base stations that are distributed around a confinement area for livestock. In some embodiments, these base stations are located in areas with high-traffic, such as water sources, areas with minerals, feed troughs, or other areas where animals frequently visit. Each animal is provided with one or more sensors that can transmit data to the base stations, such as location or motion data.

A base station of the present disclosure can be plugged into a direct power source or can be connected to a battery (any electrochemical storage cell) and/or a solar panel (photovoltaic cell). Each base station can be used to offload data from the sensors using any short-range or long-range wireless communications protocol including cellular or satellite communication.

The base stations can function as a check-in station for these sensors. The base stations can compile data such as when an animal arrives near an area of interest, how long the animal is present, and/or how often the animals come to the locations where the base stations are preset (as noted above, the base stations are placed in heavily trafficked areas of water sources, mineral, and feed-just to name a few). In other embodiments, the base station could be placed in keep-out areas where there should be no animals, and the base station can be used to sense this intrusion and transmit an alert to notifying them that animals are where they should not be (such as dangerous areas), and can take action to move them.

The base station can evaluate this data and send alerts, for example, if animals do not return to the base station over user-specified amounts of time. If an animal is determined not to have appeared at a water tank for over 48 hours it may be inferred that the animal sick. The message generated by the base station can be used to alert a recipient, such as a rancher, that the animal has not been seen or has not been detected as drinking.

The base station can be used independently, but in some embodiments, the base station has an optional water tank sensor plug-in (referred to as an adapter) that monitors the water level of a water source such as a tank, well, pond, and the like. This adapter can detect and automatically send alerts to an application when the water level falls below a certain threshold or when it becomes overfull, with the thresholds being adjustable by the user. The adapter may also send alerts when the water is freezing over or is too hot (~80 degrees Fahrenheit). In general, the adapter monitors the temperature of the water source. The adapter may detect freezing conditions in various ways by pressure monitoring (sudden 11 spikes), from ambient air temperature, water temperature, and hydrostatic water pressure—just to name a few.

B. Exemplary Telecommunications Networks

Some of the embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently. Various protocols may be utilized by the electronic devices for communications such as but not limited to HTTP, SMTP, FTP and WAP (wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit

The central communication unit may be comprised of any central communication site where communications are preferably established with. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.).

D. Mobile Device

The mobile device may be comprised of any type of computer for practicing the various aspects of the embodiments of the present disclosure. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Example Embodiments

Referring now to FIG. 1, which illustrates an example system 10 that includes base stations 11A-11C distributed inside a confinement area 12 that houses or encloses livestock 13. Each animal is provided one or more sensors 14 that are configured to transmit data to a base station. In some embodiments, the base stations are located in high-traffic areas also known as areas of interest. For example, a base station 11A can be placed near a water source 15, and base station 11B is located at a feed trough 16. Base station 11C might be located near a mineral source 29. The base stations can be spaced in such a way that they can form a mesh network in order to relay information. This arrangement is preferred when the confinement area 12 is large and some base stations may be located remotely. Example installation of base stations include integration with a water tank or feed trough, or mounted on a pole.

Figure 2:
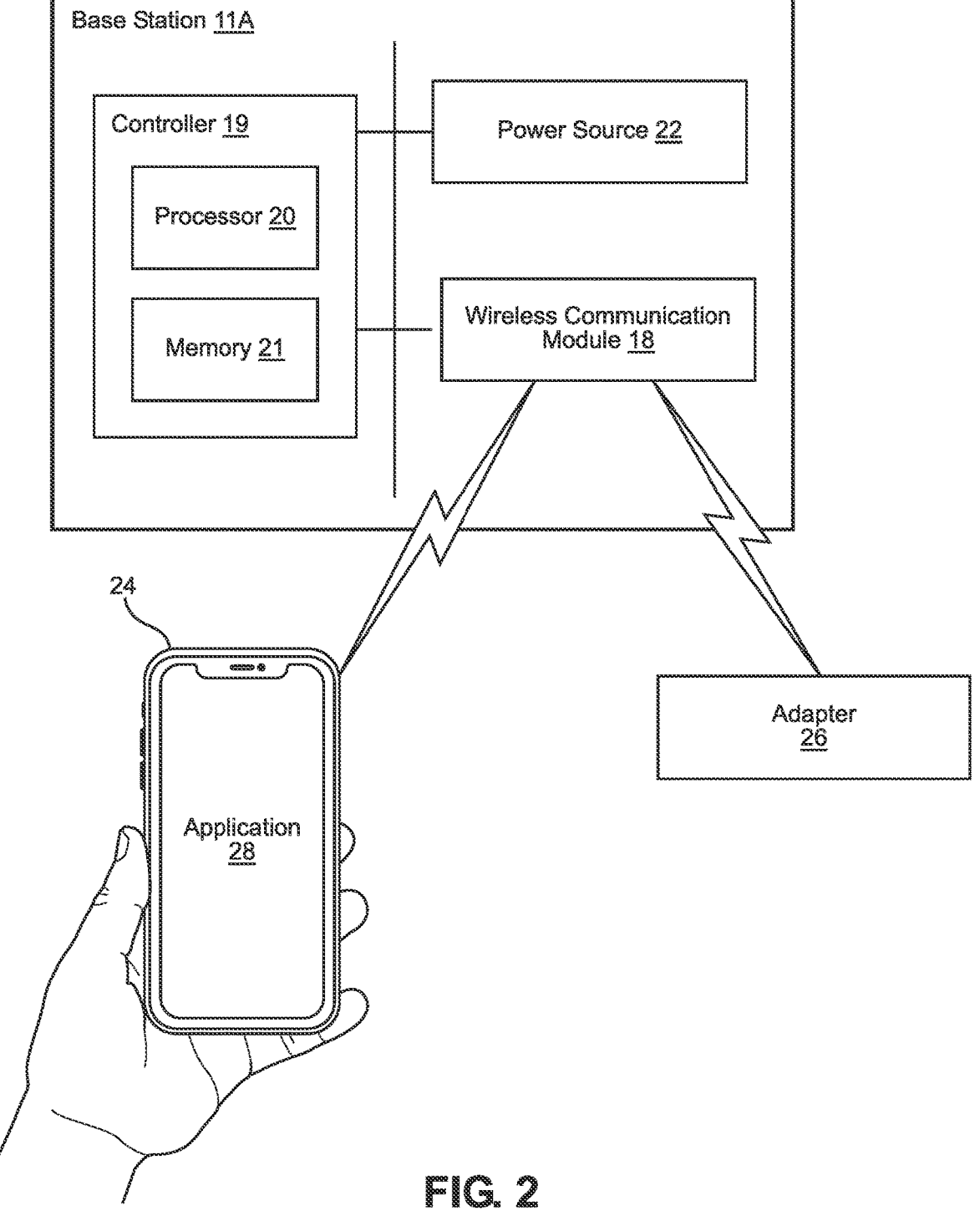
FIG. 2 is a schematic diagram of example components of the system.

FIG. 2 is a schematic diagram of an example base station, such as base station 11A. The base station 11A includes a wireless communications module 18, and a controller 19 that includes a processor 20 and a memory 21. The base station 11A can include a power source 22 that can include a direct power source, but can include any electrochemical storage cell or photovoltaic cell to store, capture, and release electrical energy. Self-contained power sourcing is preferred where the base station is not in proximity to direct power. The controller 19 of the base station can be programmed with the coordinates of the base station so that it can be compared with the location data obtained from an animal's sensor to determine when the animal is co-located with the base station. In other embodiments, the controller 19 determines that an animal is present due to receiving sensor signals from an animal's sensor.

The wireless communications module 18 can be configured to allow the base station 11A to both receive data from the one or more sensors 14 and transmit various data over a network connection to a mobile device 24 that executes an application or to a service provider 25. The wireless communications module 18 can use any short-range and/or long-range wireless protocol such as Bluetooth Low Energy (BLE), ultra-wide band, cellular, WiFi, satellite, and/or proprietary protocols—just to name a few.

Referring now to FIGS. 1 and 2 collectively, in general, the animals in an area where a base station, such as base station 11A is located, are drawn to this high-traffic area by an attractant. In this example, the attractant is the water source 15. In general, the base stations are in high-traffic areas because the animals are likely to congregate in these areas. Sensor data can be offloaded to the base station 11A by sensors 14 associated with the animals in the area. The base station 11A can receive any type of sensor data from the sensors 14 that are in communication proximity. The configurations of the wireless communications module 18 determine the extent of the communication distance and the types of protocols used. Assuming the sensors 14 are in communication distance, the sensors 14 can transmit data to the base station 11A. The sensors 14 can detect and transmit a wide variety of data such as location, motion, orientation, alerts, and the like. These data are continually transmitted while the sensors 14 are in communication distance with the base station 11A. Also, it will be understood that each time a sensor transmits data to a base station, the sensor will transmit a unique identifier for the animal along with the data. The particular format for the message and how the unique identifier is integrated may vary.

Once received, the sensor data are evaluated by the controller 19. In more detail, the processor 20 executes instructions stored in the memory 21. It will be understood that processes performed by the controller 19 implicitly include the processor executing instructions. In some instances, the controller 19 is configured to receive sensor data from the sensors 14 and determine times when the animal is present. These data can be collected over time and used to determine the frequency of how often the animal visits the area. This data can also be tracked and collected over time to determine how long an animal stays at the location.

The data obtained from the sensors 14 can be used for any desired purpose, specifically tracking the behaviors of animals. In general, the data can be tracked and evaluated to detect behavior parameters. Behavior parameters can include any of the aforementioned aspects of time, duration, frequency, and the like. In some embodiments, the controller 19 can determine anomalies or deviations in behaviors.

In one example, if an animal is not detected at the base station 11A associated with the water source 15 for a period of time, such as 48 hours, this deviation in behavior may indicate that the animal is sick. In one embodiment, the base station 11A (or service provider 25) generate a report based on a period of time, customizable according to time frame (e.g., 1 hr, 2 hr, 4 hr, 8 hr, 12 hr, 24 hr, 48 hr, 72 hr, but any time can be used) pertaining to which animal checked in at each base station and how much time that the animal spent near the base station. For example, if the animal was present for five minutes it could be inferred that the animal consumed an adequate amount of water/feed/mineral, if only there for 30 seconds it can be inferred that they did not successfully get adequate water/feed/mineral. In another example, if the animal was at base station #1 for two minutes and base station #3 for three minutes throughout the day, they may have achieved adequate amount of water/feed/mineral. In another example, a base station could be located at a feedlot pen near a feed bunk. Based on signal strength of signals from a sensor associated with the animal, the service provider could determine if any of the animals were slow to reach the area, which may indicate sickness or injury.

In some instances, multiple base stations can be placed in a certain pasture under management and a tag (sensor) can check in at any one of the base stations when the sensor is in communication range, or at any place (i.e., other pasture animals are not supposed to be in, causing an out-of-fence alert) under management to successfully be checked in and not trigger a "not seen alert" by the base station 11A or the service provider 25. The "not seen" time parameter can be user defined parameters, i.e., 12 hours since last seen. In some embodiments, an alert can be triggered based on location when an animal is somewhere that is dangerous or otherwise off limits.

In another example, the sensor data may be tracked to determine that the animal is not staying in a particular area, such as near the feed trough 16 for long enough. These data may be coupled with weight measurements or other data to confirm that the animal is not eating enough. In yet another example, if an animal is detected to be at a mineral source more frequently than expected, the controller 19 may infer that the animal is mineral deficient and requires more frequent trips to the mineral source 29.

Generally, the controller 19 is configured to collect off-loaded data from the sensors 14 associated with the live-stock. The controller 19 can evaluate these data to detect behavior parameters when the animal is present at the location. The controller 19 can then generate an alert message that indicates a deviation in the detected behavior parameters. Again, this deviation can pertain to changes from expected behavior patterns in terms of location, dura-tion, frequency, and the like. Any time an anomalous behav-ior is identified, an alert message can be generated by the controller 19. The alert messages can be of any format, such as email, SMS (short message service), an audible warning, or the like.

The controller 19 can transmit an alert directly to a mobile device 24 if it is in communication proximity to the base station 11A. In other examples, the alert messages can be transmitted over a network to the service provider 25. The service provider 25 may transmit the alert message to the mobile device 24 that is executing an application 28 that is configured to present an alert message or otherwise allow a user to interface with a livestock monitoring service.

As noted, the base station 11A can be associated with the water source 15. In this example, the water source 15 is a water tank that is accessible to the livestock. In addition to monitoring when livestock are near, how long they spend at the water source 15, and how frequently they visit the water source 15, the base station 11A can receive data regarding water tank parameters. For example, the base station 11A can communicate with a water source plug-in device, referred to as an adapter 26. The adapter 26 can be config-ured to measure water levels and water temperature, and these data can be relayed to the user as needed. The adapter 26 can include a sensor with communicative hardware. In one example, power is received from a base station, and communications are facilitated over a two-wire interface. In these instances, no data processing occurs at the adapter level, although the adapter can also be provisioned with a microcontroller.

The adapter can directly measure a water level of the water source, for example by measuring water pressure, although this is not limiting. While a water tank has been disclosed, other water sources can be monitored such as troughs, ponds, or other water retaining systems. The adapter 26 can be configured to determine when a water level is low by comparing a current water level to a water level threshold. For example, if the water tank has a critical level of one foot and the current level is below one foot, the adapter would determine that the water is low. A similar level can be maintained for an overflow level. For example, any water level reading above six feet would indicate a potential overflow. This could be caused by a broken valve or other excess rain. It will be understood that these thresh-olds can be user-determined. That is, the user can define both low-water and high-water conditions.

Regardless of the nature of the overflow or low water event, the adapter 26 can transmit a signal to the base station 11A regarding the alert. The base station 11A can directly or indirectly transmit the alert to a recipient. The adapter 26 can also be used to detect extremes of temperature. For example, the adapter 26 can use a thermocouple or thermometer to detect that the water in the water source 15 is above a threshold temperature. Animals may not drink water that has an excessive temperature. Thus, the adapter 26 can be configured to transmit an alert message when a high water temperature is detected. Also, the adapter 26 can cause a valve or other mechanism to fill the water source 15 with cold water and cool the water of the water source 15 (or fill the water source when water level is determined to be low). In some embodiments, when a low water level alert is detected, then the base station (or adapter) can send a signal to a valve to automatically open to fill a tank, as will be discussed in greater detail infra.

Similarly, the adapter 26 can be configured to detect freezing conditions. The adapter 26 can be associated with plumbing or pipes that are used to fill the water source 15. The adapter 26 can monitor this system for pressure changes such as sudden spikes that May indicate that a pipe has burst. Alternatively, the adapter 26 can detect ambient air tem-perature, water temperature in the water source 15, and hydrostatic water pressure-just to name a few. Regardless of the method used to detect freezing conditions, the adapter 26 can transmit a signal to the base station 11A that indicates that freezing conditions are imminent or have occurred. Again, this message can be forwarded to a recipient either directly or indirectly through the service provider 25. In sum, the adapter 26 can be configured to detect that the water temperature is below a first temperature threshold or above a second temperature threshold. To be sure, these water temperature thresholds can be user-defined and selected based on the requirements of the water source or system that fills the water source (if any).

To be sure, the present disclosure is not limited to using adapters for water level or temperature tracking. In some embodiments, an adapter for an electric fence monitor can also be plugged into the base station, in unison of the water tank sensor or stand-alone. The adapter could output signals or send an alert if a fence gets disconnected/shorted/turned off, so that the rancher could take action and fix it.

A base station of the present disclosure can be configured to report readings from nearby in-ground or above-ground sensors (within communication range). These sensors could measure carbon input/output, monitor soil composition, barometric pressure, or weather station data (i.e., temp, wind, humidity, and so forth).

An example base station may also have a fail-safe mode/ heartbeat/power alert function. For example, the base station may check in every hour, however it may send a "heartbeat" every 15 minutes that the base station is alive and functioning properly. If a part is to break internally or communication is disrupted and the base station during its normal "heartbeat" period, an alert may be sent alerting the rancher to check their device and that they may not get accurate reporting.

If the base station is to be plugged into a power source, and power is removed, an alert will be sent indicating the device has been unplugged. If using solar power, a low battery warning and battery level alert will be given at a certain threshold.

Figure 3:
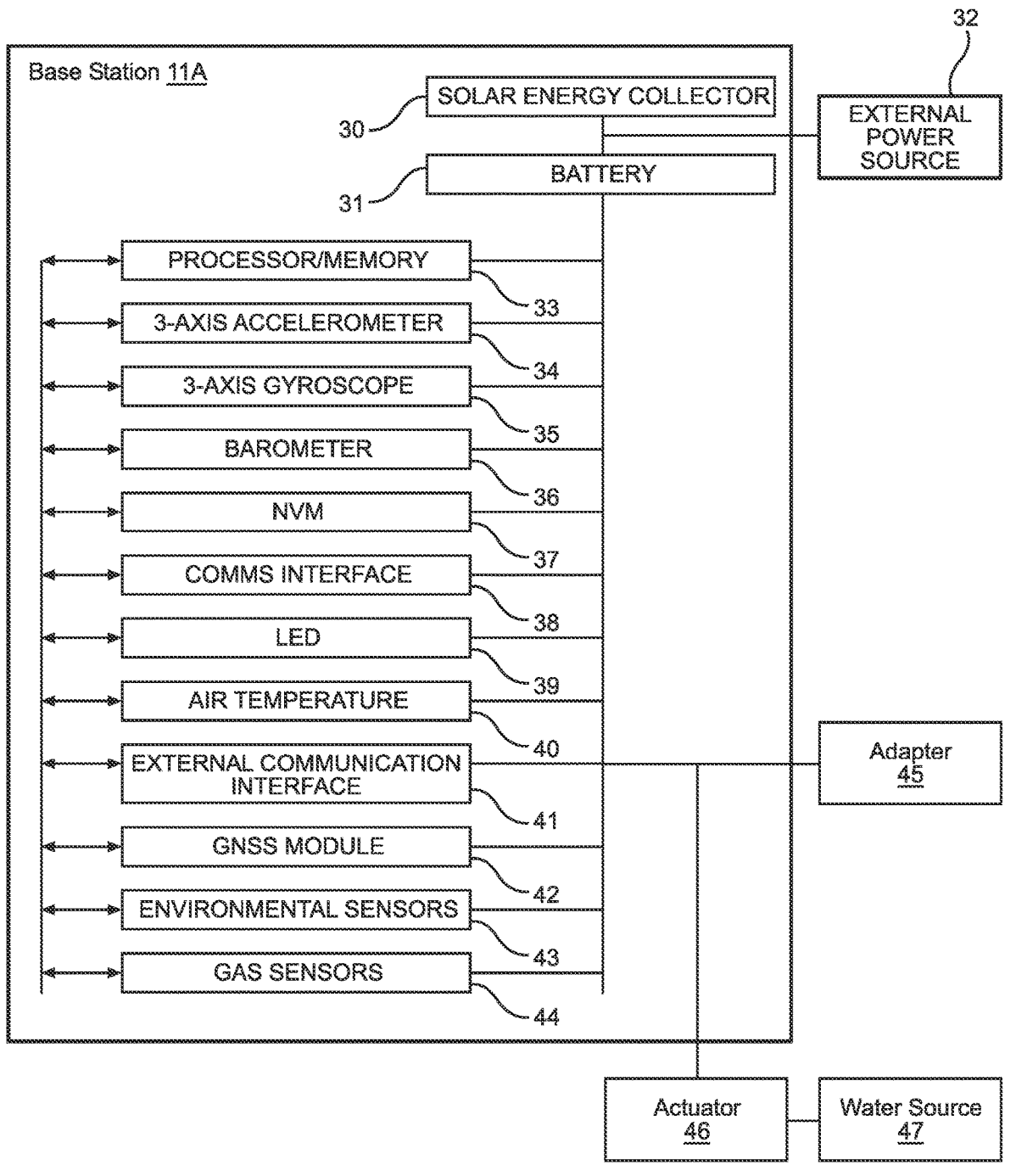
FIG. 3 is a example schematic diagram of a base station and environment.

FIG. 3 is a schematic view of an example base station and environment. The base station 11A has a solar power source 30 or a battery 31, although any power source can be used including direct power 32. The base station includes a processor/memory (controller) 33, a 3-axis accelerometer 34, a 3-axis gyroscope 35, a barometer 36, NVM 37, a communication interface 38, an LED (light emitting diode) 39, an air temperature sensor 40, an external communications interface 41, a GNSS module 42, various environmental sensors 43, and a gas sensor(s) 44. Many of the components are described in US-2022-0192152-A1, which is incorporated by reference.

A water probe or adapter 45 can be connected communicatively to the base station through the external communications interface 41. As noted above, this connection could be wired or wireless and use any desired protocol. In some embodiments, the base station could be communicative coupled to an actuator 46 such as a valve, servo, switch, or a similar component. The actuator 46 is configured to trigger the opening or closing off of a water source 47. The base station can cause the actuator 46 to trigger in response to signals from the adapter 45 as set forth above.

Referring now to FIG. 4 which illustrates an example method. The method can include a step 48 of deploying a base station in a location within a confinement area for livestock. This step can include placing base stations at high traffic areas or areas of interest such as water tanks, feed troughs, minerals, and the like. These areas may be spread out over a large area so that some base stations are located remotely. The base station can be powered by any suitable means including solar power. Base stations, as noted above, can form a mesh network in order to relay alerts from base stations that are located remotely or far away in the confinement area.

The method can include a step 49 of receiving sensor output from a sensor associated with an animal when the animal is in communication range. It will be understood that the sensor output comprises at least location information. To be sure, the sensor information can include location, orientation, speed, angle, or any other similar parameter. In step 50, the method may include monitoring the location information to detect behavior parameters when the animal is present at the location. Other behaviors such as time spent and frequency of visitation can be tracked based on location information. As noted above, this data can be tracked on an animal-by-animal basis because each sensor transmits a unique animal identifier along with its data. Thus, location or motion information can be tied to a particular animal. Next, the method can include a step 51 of determining a deviation in the behavior parameters. For example, an animal has not visited a base station associated with a water tank in two or more days. In general, the determination of behavior parameters is accomplished by determining any of a time, a duration, and/or a frequency for when the animal is at the location.

This deviation in behavior is detected and the method include a step 52 of generating an alert message when a deviation is detected in the behavior parameters. Finally, the method includes a step 53 of transmitting the alert message to at least one recipient. As noted above, this can include transmitting an alert to a mobile device of a user that is equipped with an application that can receive the alert and display the same to the user.

FIG. 5 is a flowchart of another example method of the present disclosure. The method pertains to the use of an adapter that is associated with a water source. In this instance, the adapter is associated with a water source and a base station is co-located in proximity to the water tank or other water source that is being monitored by the adapter. The adapter can be a sensor like a tank float with an associated thermostat. In this way the adapter can detect both water level and temperature. Other parameters can also be tracked such as water quality or other similar parameters.

The method can include a step 54 of communicatively coupling an adapter with a base station. This communicative coupling may include wired or wireless methods of communication. The adapter can be an IoT (Internet-of-Things) device that is configured to collect sensor data and report the same to the base station. In some instances, the adapter includes a controller that can process the sensor data.

Thus, the method includes a step 55 of detecting, from the adapter, a level of water in the water source. This level could be a raw water level value that is used by the base station to make threshold comparisons. For example, the method can include a step 56 of receiving, from the adapter, a signal when the level is below a first-level threshold or above a second-level threshold. In one embodiment, the first level threshold is a low water level. In another embodiment, the second level threshold is an overflow or high water level. Thus, if a current water level is below or above these thresholds, the signal is generated. Again, this can be accomplished at the level of the adapter when the adapter is provisioned with compute resources. On the other hand, the water levels and comparisons are performed at the base station level. In this instance, the current water level is communicated back to the base station for comparison with thresholds. Again, these levels can be configured by the user according to their specific needs.

In some embodiments, the method can include a step 57 of receiving, from the adapter, a signal when a temperature of the water is below a first temperature threshold or above a second temperature threshold. The first temperature threshold may be a low-temperature level such as just above freezing, or any temperature below freezing. On the other hand, the second level is a high-temperature level. For example, water that is above approximately 80 degrees may cause livestock to avoid drinking. Again, these thresholds can be user-defined and tailored to the proclivities of the livestock. Some animals May refuse water that has a temperature above a certain threshold, while other types of animals may refuse water that has a temperature above another threshold that might be higher.

In step 58, the method may include generating and transmitting an alert based upon the detection of a threshold exceeding condition. This can include the detection of any time a current water level or a current water temperature falls below or exceeds a threshold that was established by a user. Again, the alert message may be triggered by the adapter itself or by a base station that is in communicative coupling with the adapter. The format of the alert message is not intended to be limiting but could include data transmitted to a mobile device used by an administrator. A specifically formatted message can be displayed to the user that informs them of the specific type of threshold exceeding condition that was experienced. In some embodiments, alert message can also be sent when a level (either temperature or water level) is approaching a threshold level.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

What is claimed is:

1. A system for monitoring a water supply for livestock animals, the system comprising:
   a plurality of livestock sensors wherein each of the plurality of livestock sensors is associated with a respective livestock animal from among a plurality of livestock animals within a livestock confinement area;
   a water sensor associated with a livestock water source, wherein the livestock water source and the water sensor are located within the livestock confinement area; and
   a base station located at the livestock water source within the livestock confinement area, the base station having a processor and a memory for storing instructions, the processor executing the instructions to:
      receive livestock sensor output from one or more of the plurality of livestock sensors when the one or more of the plurality of livestock animals are in communication range of the base station;
      monitor the livestock sensor output to detect one or more behavior parameters, in relation to the livestock water source, when the livestock animal is in communication range with the base station, wherein the one or more behavior parameters include at least one of a presence of the livestock animal in the communication range, a duration of the livestock animal in the communication range, and a frequency of the livestock animal entering the communication range;
      generate a behavior alert message when a deviation from a predetermined threshold is detected in the one or more behavior parameters and transmit the behavior alert message to at least one recipient;
      receive water sensor output associated with the livestock water source, wherein the water sensor is in communication range of the base station;
      monitor the water sensor output to detect one or both of a water level of the livestock water source and a water temperature of the livestock water source;

generate a water level alert message when a deviation in the water level is detected as being above or below a predetermined water level threshold and transmit the water level alert message to the at least one recipient; and generate water temperature alert message when a deviation in the water temperature is detected as being above or below a predetermined water temperature threshold and transmit the water temperature alert message to the at least one recipient.

2. The system according to claim 1, wherein the base station includes a wireless communications module that receives the livestock sensor output and the water sensor output, wherein the wireless communications module uses any of short- or long-range wireless protocols.

3. A method, comprising:

deploying a base station at a livestock water source located within a confinement area for a plurality of livestock animals;

receiving a livestock sensor output at the base station from a livestock sensor associated with one of the plurality of livestock animals when the one of the plurality of livestock animals is in communication range of the base station;

monitoring with the base station the livestock sensor output to detect one or more behavior parameters of the one of the plurality of livestock animals, in relation to the livestock water source, when the one of the plurality of livestock animals is in communication range with the base station, wherein the one or more behavior parameters include at least one of a presence of the one of the plurality livestock animals in the communication range, a duration of the one of the plurality of livestock animals in the communication range, and a frequency of the one of the plurality of livestock animals entering the communication range;

generating with the base station a behavior alert message when a deviation from a predetermined threshold is detected in the one or more behavior parameters and transmitting, via the base station, the behavior alert message to at least one recipient;

receiving, at the base station, water sensor output associated with the livestock water source, wherein the water sensor is in communication range of the base station;

monitoring, with the base station, the water sensor output to detect one or both of a water level of the livestock water source and a water temperature of the livestock water source;

generating, with the base station, a water level alert message when a deviation in the water level is detected as being above or below a predetermined water level threshold and transmitting, via the base station, the water level alert message to the at least one recipient; and generating, with the base station, a water temperature alert message when a deviation in the water temperature is detected as being above or below a predetermined water temperature threshold and transmitting, via the base station, the water temperature alert message to the at least one recipient.

4. A system, comprising:

a livestock sensor associated with each of a plurality of livestock animals in a livestock confinement area;

a plurality of base stations, each of the plurality of base stations positioned at a location in the livestock confinement area, wherein at least one of the plurality of base stations is associated with a livestock water source; and a water sensor associated with the livestock water source that outputs a signal indicative of a water level and a water temperature of the livestock water source;

wherein the plurality of base stations monitor livestock sensor output of the livestock sensor to detect one or more behavior parameters of the livestock animal, in relation to the livestock water source, when the livestock animal is present at the location, generate a behavioral alert message when a deviation from a predetermined threshold is detected in the one or more behavior parameters, and transmit the behavioral alert message to a recipient, wherein the one or more behavior parameters include at least one of a presence of the livestock animal at the location, a duration of the livestock animal at the location, and a frequency of the livestock animal being present at the location; and wherein the at least one of the plurality of base stations monitor the signal of the water sensor to detect one or both of the water level of the livestock water source and the water temperature of the livestock water source, generate one or both of a water level alert message and a water temperature alert message when a deviation from a predetermined threshold is correspondingly detected in one or both of the water level and the water temperature, and transmit one or both of the water level alert message and the water temperature alert message to the recipient.

5. The system of claim 4, wherein at least one of the plurality of base stations is associated with a food source.

6. The system of claim 5, wherein at least one of the plurality of base stations is associated with a mineral source.

* * * * *